United States Patent Office 3,430,247
Patented Feb. 25, 1969

3,430,247
CENTERFED TRAVELLING WAVE ARRAY HAVING A SQUINTED APERTURE
Sam H. Wong, Los Angeles, Calif., assignor to North American Rockwell Corporation, a corporation of Delaware
Filed Sept. 5, 1967, Ser. No. 665,386
U.S. Cl. 343—771                13 Claims
Int. Cl. H01q 13/10

ABSTRACT OF THE DISCLOSURE

A symmetrical centerfed travelling wave assembly comprising a pair of angularly-squinted arrays of slotted travelling wave line sources. Because each array of the centerfed pair of arrays is the mirror image of the other, frequency scanning sensitivity of both produces oppositely-scanning component beams, resulting in a non-scanning composite beam over a broad-bandwidth. Also, because the component arrays of an array pair are mutually angled or squinted, the antenna assembly boresight or aperture broadside direction is not parallel to the broadside direction of either component array, whereby the impedance mismatches and high standing wave ratios associated with the narrow-bandwidth and resonant frequencies of the broadside beam region may be avoided and improved broadband impedance matching obtained. Further, a controlled aperture distribution may be conveniently effected for improved multi-mode monopulse data processing.

Cross-references to related applications (1) U.S. application Ser. No. 409,912 filed Nov. 9, 1964, by J. A. Algeo for Microwave Antenna Having a Controlled Phase Distribution, now Patent No. 3,355,738.

(2) U.S. application Ser. No. 458,113 filed May 24, 1965, by S. H. Wong for a Scanning Antenna.

Background of the invention

In the design of monopulse radar systems for the accurate determination of target angle positions, mechanically-scanned reflectors and lens-type antennas (and associated feeds therefor) have been extensively employed in the prior art because the beam-pointing angle thereof is substantially independent of wavelength (or frequency). Thus, where frequency-diversity or frequency-hopping is included in a radar system as an electronic countermeasure feature or where a wide transmitted bandwidth is required for pulse compression or range resolution improvement purposes, the inclusion of such modes has not interfered with the beam pointing accuracy of such antennas.

However, the use of such dish-type antennas in multi-mode radar systems presents a number of disadvantages. First, the geometry of locating the feedhorn at a focal point of the reflector presents a high moment of inertia for mechanical scanning purposes. Secondly, the efficiency of a dish type antennas is low due to aperture blockage and due to radiation spill-over beyond the peripheral limits of the dish. Also, the number of discrete beam-shapes obtainable for different radar system modes (e.g., search, track, groundmap, etc.) is limited due to limits on the permissible combinations of reflector shape and orientation obtainable. Attempts to increase the variety of beam shapes, by use of selectively polarized energy in combination with rotatable polarization sensitive grids and the like, serve to increase the antenna moment of inertia while still providing only a limited number of beam patterns and limited beam pattern switching speeds. Further, in a monopulse application, the linearity of the determination of target angle-off-boresight is limited, as discussed in U.S. Patent 3,165,746 to R. G. Whitnah for Monopulse Receiver. Moreover, the determination of such target angle or attempts at monopulse resolution improvement (beta-gating) may be ambiguous due to anomalies occurring in the sidelobes of the antenna pattern unless either phase or amplitude control of the aperture field distribution is provided, as discussed in U.S. Patent 3,283,322 issued to R. E. Hovda et al. for Monopulse Receiver Apparatus and in U.S. application Ser. No. 409,912 filed Nov. 9, 1964, by J. A. Algeo, assignor to North American Aviation, Inc., assignee of the subject invention.

Such non-linearity and anomalies in a monopulse application of a dish type antenna arise from the fact that the idealized equations for the far-field pattern in the elevation and azimuth planes produced by the geometry of the three-dimensional curvature of dish reflector, may not be treated separately. Instead, such actual curvature represents a difficult compromise of such equations.

Parallel corporate-fed planar arrays provide a wide band antenna; however, the production costs, weight and volume of prior art planar arrays having not been competitive with simple dish or reflector type antennas. Standing wave types of arrays, while being compact and lightweight, are essentially narrow bandwidth devices, the bandwidth being limited to the resonant frequency region associated with the high standing wave ratio (VSWR) phenomenon. Also, the tight design tolerances associated with such narrow bandwidth make such devices costly to manufacture.

End-fed travelling arrays are easy to design and are wide-band devices; but the beam pointing angle of such a device is frequency sensitive, requiring associated direction-frequency indicating logic.

Hence, for the above-noted reasons mechanically scanning arrays have not been competitive with mechanically scanning dish type (parabolic reflector type) antennas for airborne radar systems applications, despite the fact that such dish-type antennas display certain disadvantages and limitations.

Summary of the invention

By means of the concept of a center-fed travelling wave array, the above-noted disadvantages and limitations of the prior art are avoided, and a competitive wide-bandwidth device having improved performance is provided.

In a preferred embodiment of the subject invention, there is provided an antenna assembly comprising a plurality of center-fed slotted travelling wave line sources, each line source having two mutually angled portions, the sources being parallel stacked to comprise a symmetrical center-fed assembly of at least two mutually-angled arrays.

By means of such an arrangement, a broad band non-scanning antenna is provided. Because each array of the centerfed symmetrical pair of arrays is the mirror image of the other, frequency-scanning of both arrays concomitantly produces oppositely-scanning component beams, resulting in a non-scanning composite beam over a wide frequency bandwidth. Also, because the component arrays of an array pair are mutually angled or squinted, the antenna assembly boresight or aperture broadside direction is not parallel to the broadside direction of either component array, whereby the impedance mismatches and high standing wave ratio associated with the broadside beam region of a component array can be avoided. Such broadband device, not being subject to the tolerances of a narrow band standing array, is also less expensive to manufacture. Further, selective control of the aperture field distribution may be effected by the inclusion of voltage-controlled phase shifters in the corporate feed for such array pair and by other means for allowing high speed beam-switching from one-beam-pattern or antenna mode to another, while a tapered distribution for each line source of each array may be conveniently achieved to effect improved linearity of, and avoidance of anomalies in, a monopulse difference signal pattern in a monopulse system application.

Such a monopulse application also avoids the alignment required between the feedhorn and dish of a reflector type monopulse antenna. Moreover, such centerfed array pair is more efficient than a dish-type reflector in not being subject to losses due to "spill over." Nor does such array pair present as large a moment of inertia for mechanical scanning purposes, the center of mass thereof being nearer the center of rotation.

Accordingly, it is a broad object of the subject invention to provide an improved broadband antenna.

It is another object of the invention to provide a broadband antenna having increased utility in a multi-mode radar system.

It is still another object to provide a broadband monopulse antenna having improved beta linearity and adapted for monopulse resolution improvement techniques.

A further object is to provide a mechanically-scannable broadband antenna having a relatively low moment of inertia.

These and other objects of the invention will become apparent from the following description, taken together with the accompanying drawings, in which.

In the figures, like reference characters refer to like parts.

*Description of the preferred embodiments*

Figure 1:
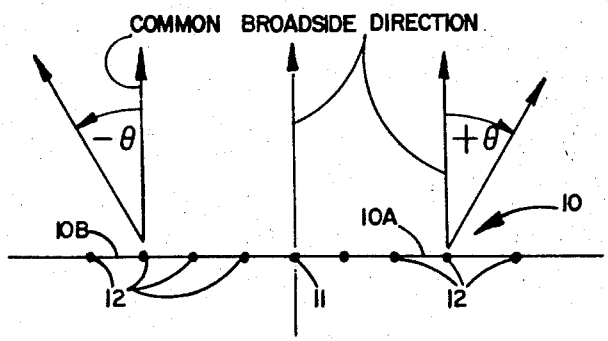
FIG. 1 is a schematic diagram of a symmetrical centerfed travelling wave line source, illustrating the oppositely-scanning component beams resulting from a frequency-scanned excitation applied thereto.

Referring now to FIG. 1, there is illustrated a schematic arrangement of a symmetrical centerfed slotted travelling wave line source 10, having a centerfeed point 11 and a plurality of mutually spaced slots or radiating apertures 12. Centerfed line source 10 may be viewed, alternatively, as comprising two end-fed component line sources 10a and 10b, each of which is the mirror image of the other. The injection of a radio frequency excitation at feedpoint 11 and having a waveguide wavelength corresponding to an integer submultiple of the uniform spacing $d$ between adjacent ones of slots 12, will result in a propagating wave front which propagates in a direction normal to or broadside to the linear array 10. If, however, the frequency of such radio frequency energy is changed from a broadside direction frequency $f_o$, then the relative phase between adjacent ones of slots 12 is changed, thereby causing a change $\theta$ in the propagation direction, as is understood in the art, being fully explained for example in my copending U.S. application Ser. No. 458,113 filed May 24, 1965. However, because component arrays 10a and 10b are oppositely arranged, it is to be appreciated that frequency scanning of an injected source of radio frequency energy causes the two component beams produced by sub-arrays 10a and 10b to mutually oppositely scan in space ($+\theta$ and $-\theta$), resulting in a non-scanning composite beam over the bandwidth of such scanned frequencies.

The voltage standing waveform ratio (VSWR) resonant characteristic of a travelling wave array as a function of frequency is similar to that of a radiation pattern produced by such array. The input reflection coefficient $\Gamma$ of a travelling wave array as a function of frequency can be approximated by:

$$\Gamma(\beta) = \sum_{n=1}^{N} \gamma_n \operatorname{Exp} j2nd(\beta - \beta_o) \tag{1}$$

where:
$\gamma_n$ = the reflection coefficient of the $n$th element
$d$ = element spacing
$\beta$ = propagation constant in waveguide (for frequency, $f$)
$\beta_o$ = that waveguide propagation constant which corresponds to a line source broadside beam frequency, $f_o$
N = number of end-fed elements Assuming a uniform reflection coefficient ($\gamma_n = \gamma_o$), $$|\Gamma(\beta)| = \left| \frac{N\gamma_o \sin [Nd(\beta - \beta_o)]}{\sin [d(\beta - \beta_o)]} \right| \tag{2}$$

Figure 2:
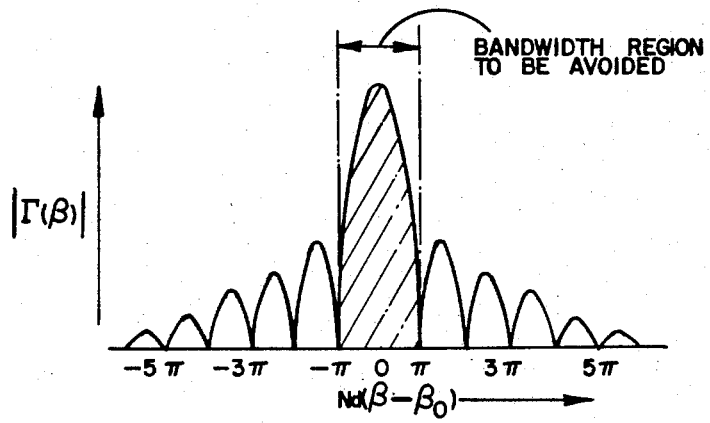
FIG. 2 is a spectral diagram of a representative bandwidth of an exemplary travelling wave line source, illustrating the bandwidth of the resonant frequency region associated with a broadside beam condition.

A plot of Equation 2 as a function of $Nd(\beta - \beta_o)$ is shown in FIG. 2, from which it is seen that $\Gamma(\beta)$ is a minimum when $Nd(\beta - \beta_o) = M\pi$, where M is a positive or negative integer number. The high VSWR, occurring in a travelling wave array at a broadside frequency $f_o$, corresponds to a large mismatch of impedance. Therefore, it is desirable to so employ the travelling wave array that a broadside beam therefor occurs at a frequency outside of the frequency band of the antenna system in which such array is intended to be utilized.

In other words, the VSWR of the antenna should be made low within the operating band of the antenna to reduce impedance mismatches, by employing an antenna bandwidth outside the forbidden frequency region illustrated in FIG. 2 as: $-\pi < Nd(\beta - \beta_o) < \pi$.

Figure 3:
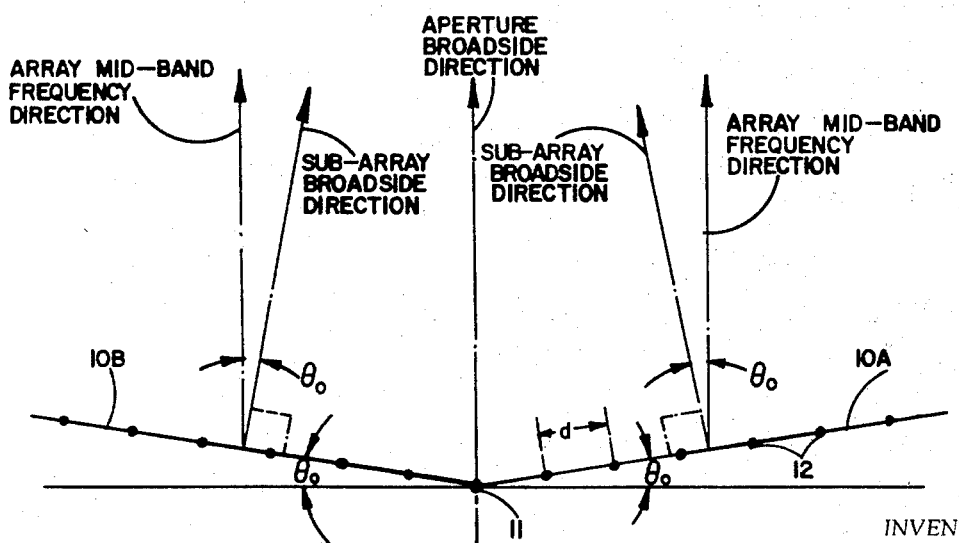
FIG. 3 is a schematic diagram of a symmetrical centerfed travelling wave line source having a squinted aperture.

It has been discovered that a low input VSWR for a travelling array may be obtained by angularly squinting each half of a symmetrical center-fed array relative to the other, as shown in FIG. 3. In other words, if the device of FIG. 1 were operated at an array mid-band frequency which excludes the broadside frequency region, the mutually oppositely-squinted component beams produced by sub-arrays 10a and 10b, while providing a composite broadside beam, would also introduce a large even-valued phase distribution across the array aperture, which would tend to increase the antenna side lobes and decrease the antenna gain. To compensate for such undesirable features of high sidelobes and low gain, each sub-array is physically angularly squinted by an angle $\theta_o$ corresponding to and compensating for the look angle produced by a direction frequency equal to the center frequency of the bandwidth utilized. In this way, a low VSWR, low sidelobe performance, and high gain are preserved over such bandwidth.

Such squint angle $\theta$ may be conveniently determined from the array equation for the look-angle or direction $\theta$ associated with a given direction frequency (or wavelength $\lambda$), as given in U.S. Patent No. 3,039,097 issued June 12, 1962, to Strumwasser et al., for Frequency Sensitive Rapid Scanning Antenna:

$$\theta = \sin^{-1} \frac{s}{d}\left(\frac{\lambda}{\lambda_g} - \frac{\lambda}{\lambda_{g_0}}\right) \quad (3)$$

where:

$\theta$ = scan angle off the broadside direction
$\lambda$ = free space wavelength of the radiated energy
$\lambda_g$ = waveguide wavelength of the radiated energy
$\lambda_{g_0}$ = waveguide wavelength for a broadside beam
$d$ = center-to-center spacing between adjacent elements of the lineal array
$s$ = incremental feedline length connecting adjacent radiating slots.

For the case of the travelling wave line source described above, $s/d$=unity. Thus, Equation 3 may be rewritten as follows:

$$\theta = \sin^{-1}\left(\frac{\lambda}{\lambda_g} - \frac{\lambda}{\lambda_{g_0}}\right)$$

and a limiting value for the squint angle $\theta_0$ may be determined from the wavelength of an end frequency of the system bandwidth which is closest to the line source broadside wavelength:

$$\theta_0 = \sin^{-1}\left(\frac{\lambda_e}{\lambda_{g_e}} - \frac{\lambda_e}{\lambda_{g_0}}\right) \quad (5)$$

where:

$\lambda_e$ = free space wavelength of the end frequency of the system bandwidth limit, and
$\lambda_{g_e}$ = waveguide wavelength of the end frequency of the system bandwidth limit.

In other words, where the system bandwidth is selected to be above the broadside frequency $f_0$ of the travelling wave line source, the lowest frequency of such system bandwidth may be used to calculate a limit or lowest acceptable value for $\theta_0$. Alternatively, where the system bandwidth is selected to be above the broadside frequency $f_0$, then the highest frequency of such bandwidth may be used to calculate such limit value for $\theta_0$.

Figure 4:
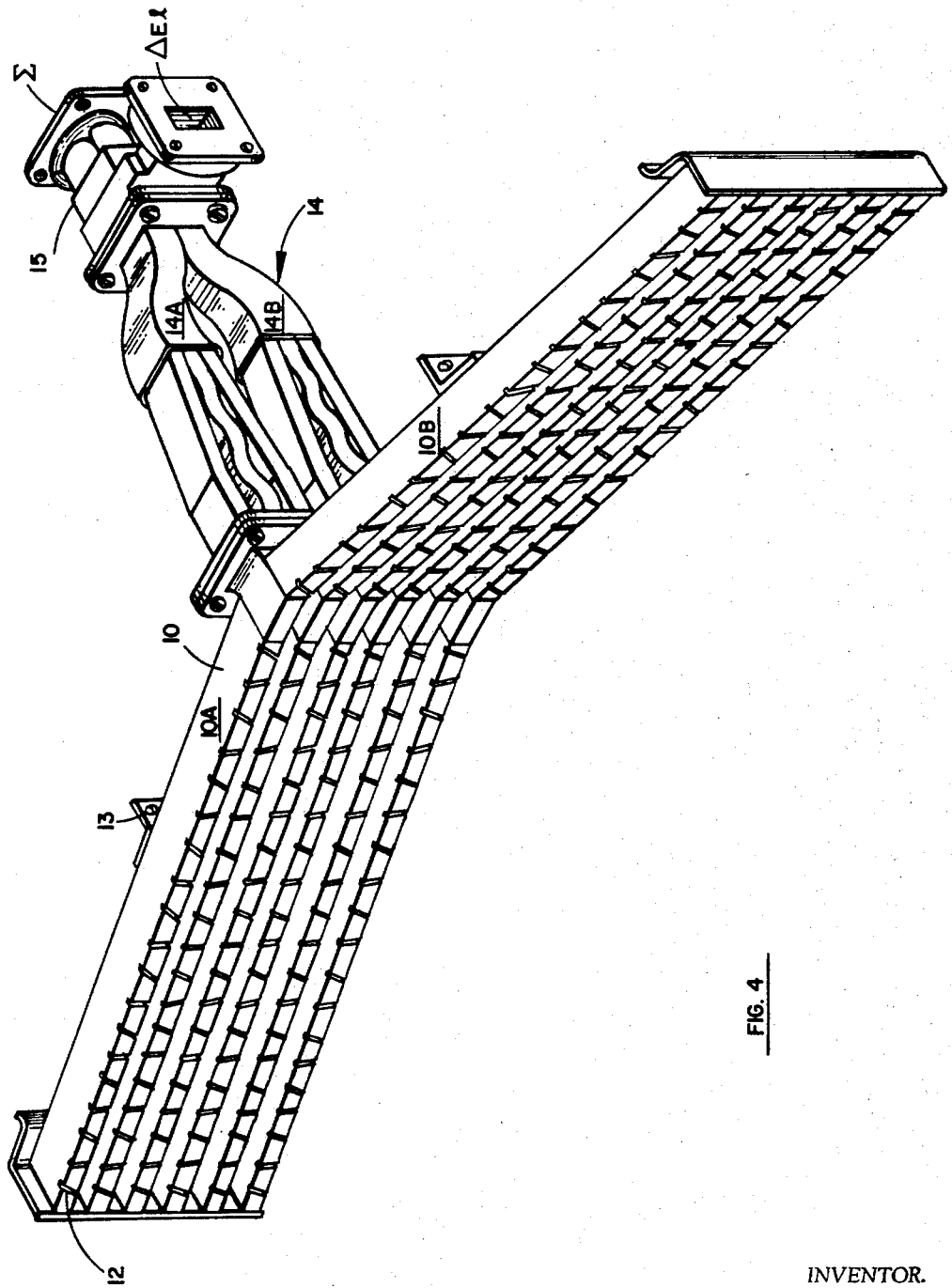
FIG. 4 is a perspective view of the front of a center-fed travelling wave assembly, illustrating one aspect of the inventive concept.
Figure 5:
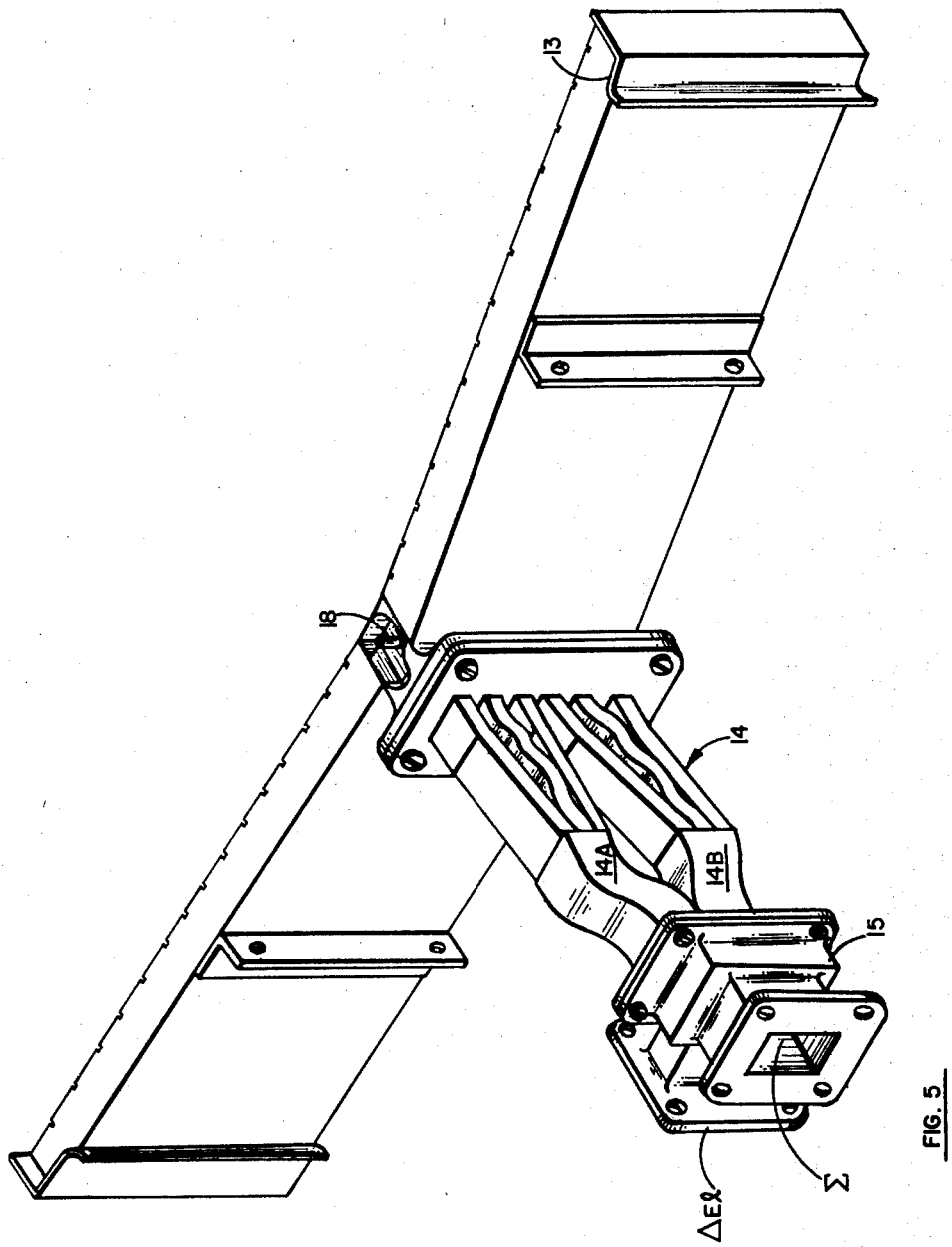
FIG. 5 is a perspective view of the rear of the device of FIG. 4, illustrating one arrangement of the corporate feed of the centerfed array, adapted for a single plane monopulse system application.

A preferred embodiment of the inventive concept adapted for a single plane monopulse application is shown in FIGS. 4 and 5.

Referring to FIGS. 4 and 5, there is illustrated a respective front and rear view in perspective of a centerfed travelling wave assembly. Such assembly comprises a plurality of mutually parallel centerfed slotted travelling wave line sources 10, each having two mutually-angled portions 10a and 10b, sources 10 being stacked to form a symmetrical centerfed assembly of at least two mutually angled arrays. L-beams or channel metal pieces 13 may be brazed or otherwise fastened at the backside of the assembly for securing the line sources 10 and maintaining them in a desired or preselected mutually spaced relationship. This mounting structure may also be adapted to cooperate with electromechanical means (not shown) for scanning the antenna, including provision of necessary microwave rotary joints. The centerfeed point 11 of each centerfed line source 10 may include a metallic centerpost 18 or like structure cooperating as a microwave power splitter for the excitation of both halves of such centerfed line source, as is understood in the art. A corporate feed 14 to the centerfeed points 11 at the back of the array (see FIG. 5) comprises an assembly of two sets of feeds 14a and 14b, one for each set of centerfed line sources on a respective side of a plane of symmetry parallel to the plurality of line sources 10. In other words, as illustrated in FIGS. 4 and 5 a first set of parallel feeds 14a is coupled to an upper half of the plurality of centerfed line sources and a second set of parallel feeds 14b is coupled to a lower half thereof. Such two sets 14a and 14b of the corporate feed are connected in microwave circuit to a respective one of opposite input ports A and B of a microwave hybrid junction 15 whereby the device of FIGS. 4 and 5 is adapted as a single plane (elevation) monopulse antenna.

Figure 6:
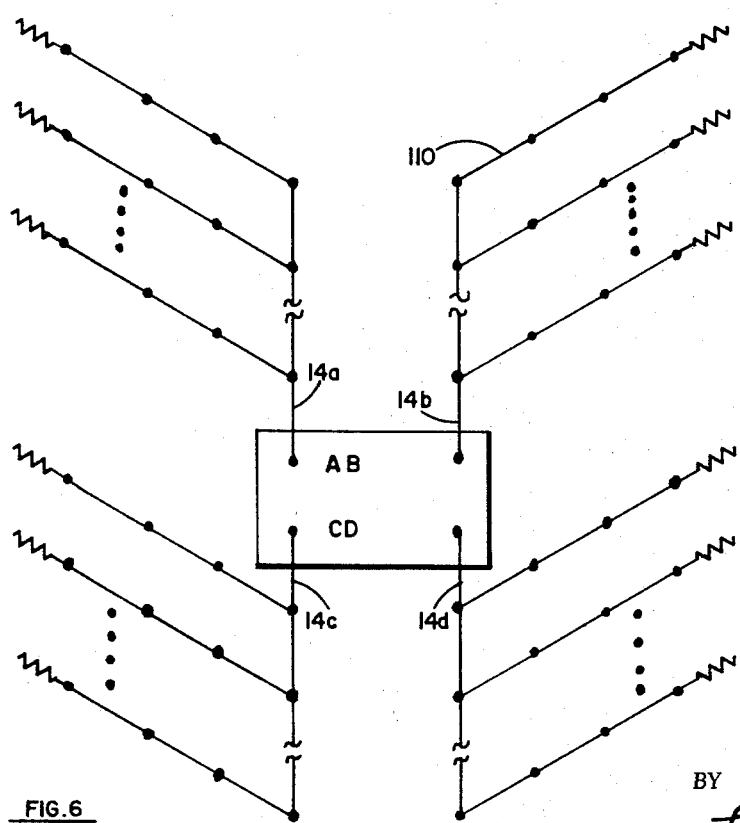
FIG. 6 is a schematic arrangement of an alternative embodiment of the inventive concept, employing a series corporate feed and adapted for a dual plane monopulse application.
Figure 9:
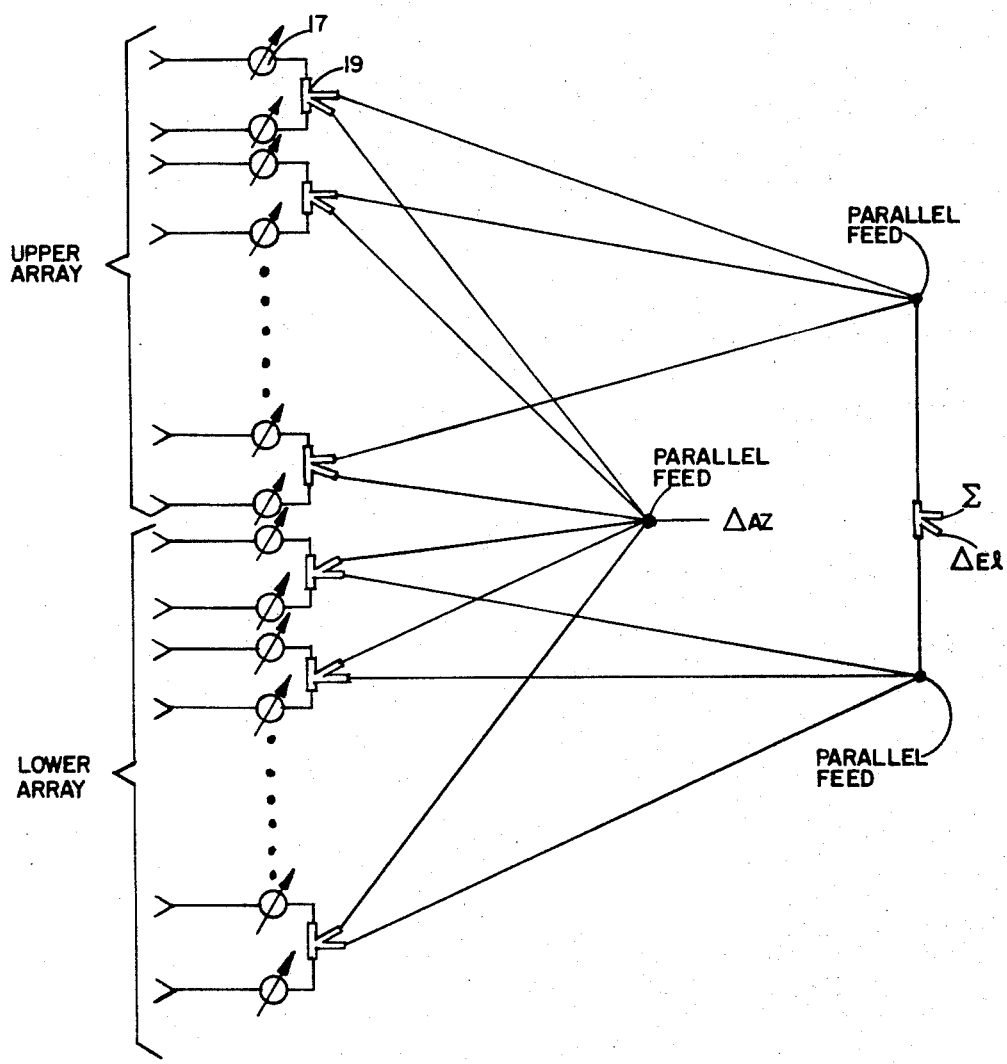
FIG. 9 is a schematic diagram of an alternate dual plane monopulse arrangement.

By arranging the mutually-angled halves of the line sources into separate end-fed line sources, as shown schematically in FIG. 6, then the centerfed symmetrical array of FIGS. 4 and 5 may be made to cooperate with a suitable corporate feed assembly comprising two sets of feeds one for each set of end-fed line sources on a respective side of a plane of symmetry perpendicular to the orientation of the plurality of mutually parallel line sources, which corporate feed sets may couple a respective one of the sets of end-fed lines to opposite input ports (A and B or C and D) of a microwave hybrid junction to provide a single plane monopulse mode (in azimuth) in a plane perpendicular to that provided by the arrangement of FIGS. 4 and 5. FIG. 6 further illustrates in schematic form a symmetrical centerfed assembly of end fed line sources 110 arranged for dual-plane monopulse operation. Four sets (14a, 14b, 14c and 14d) of series corporate feeds are provided, each set connected to a mutually exclusive set (A, B, C and D) of end-fed line sources situated on a preselected side of each of the two mutually perpendicular planes of symmetry, each series corporate feed comprising one port of a four input port (A, B, C and D) dual-plane microwave bridge 16 (shown schematically as a dotted block). An alternate dual plane monopulse arrangement, employing a parallel corporate feed structure and magic tees 19, is shown in FIG. 9.

Figure 10:
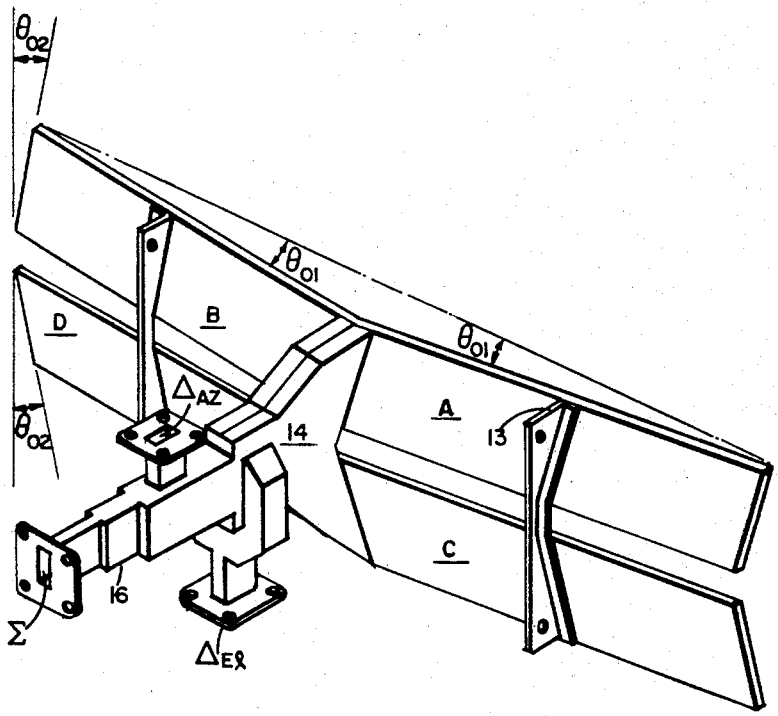
FIG. 10 is a rear view in perspective of a dual plane monopulse embodiment of the invention.

Amplitude tapering of the aperture field distribution for the avoidance of monopulse beta anomalies is conveniently accomplished in both planes by control of the slot dimensions, as is well understood in the art. However, in a dual plane monopulse application of a series corporate feed, it may also be desirable to angularly squint the lower sets or arrays of line sources in elevation relative to the upper sets or arrays, in addition to the angular squinting in azimuth between the left-side and right side arrays, as shown in FIG. 10.

Figure 7:
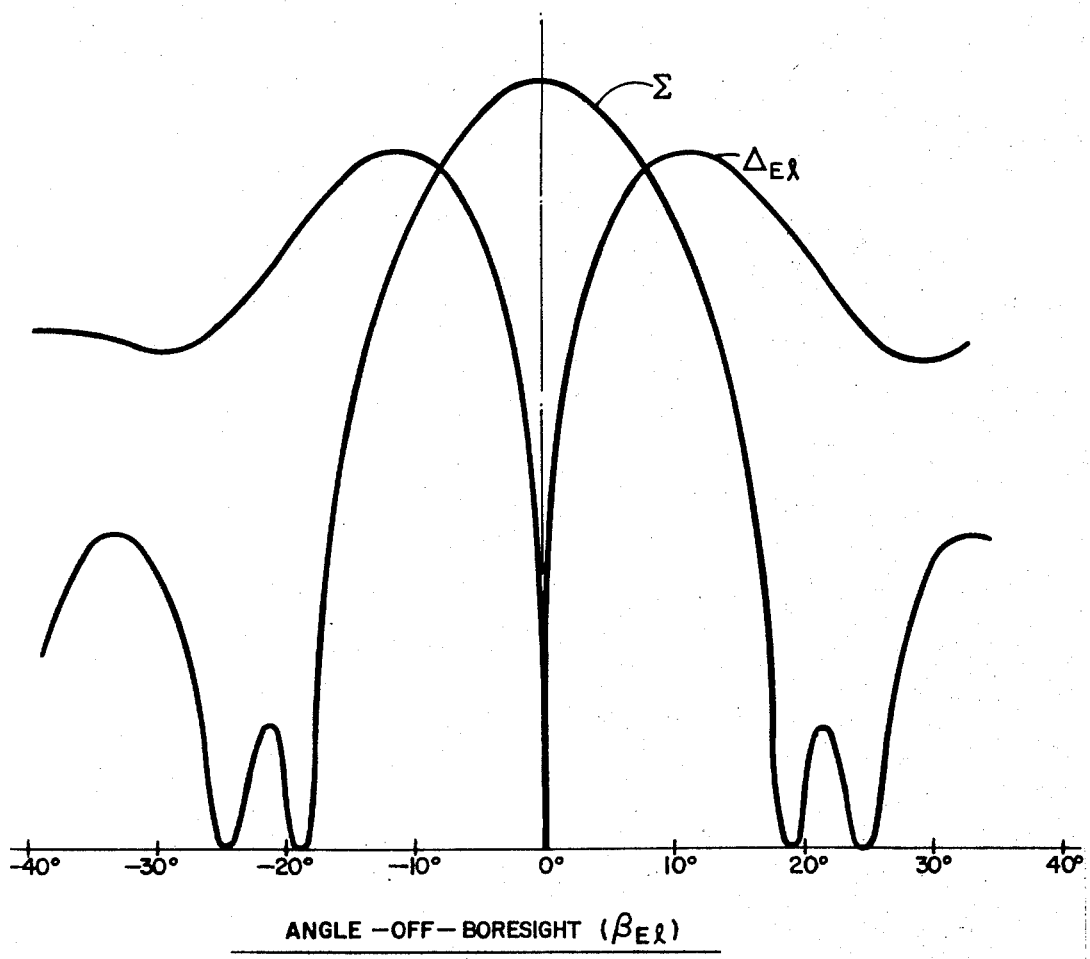
FIGS. 7 and 8 are families of exemplary monopulse response patterns as functions of angle-off-boresight for the dual plane monopulse arrangement of FIG. 6.
Figure 8:
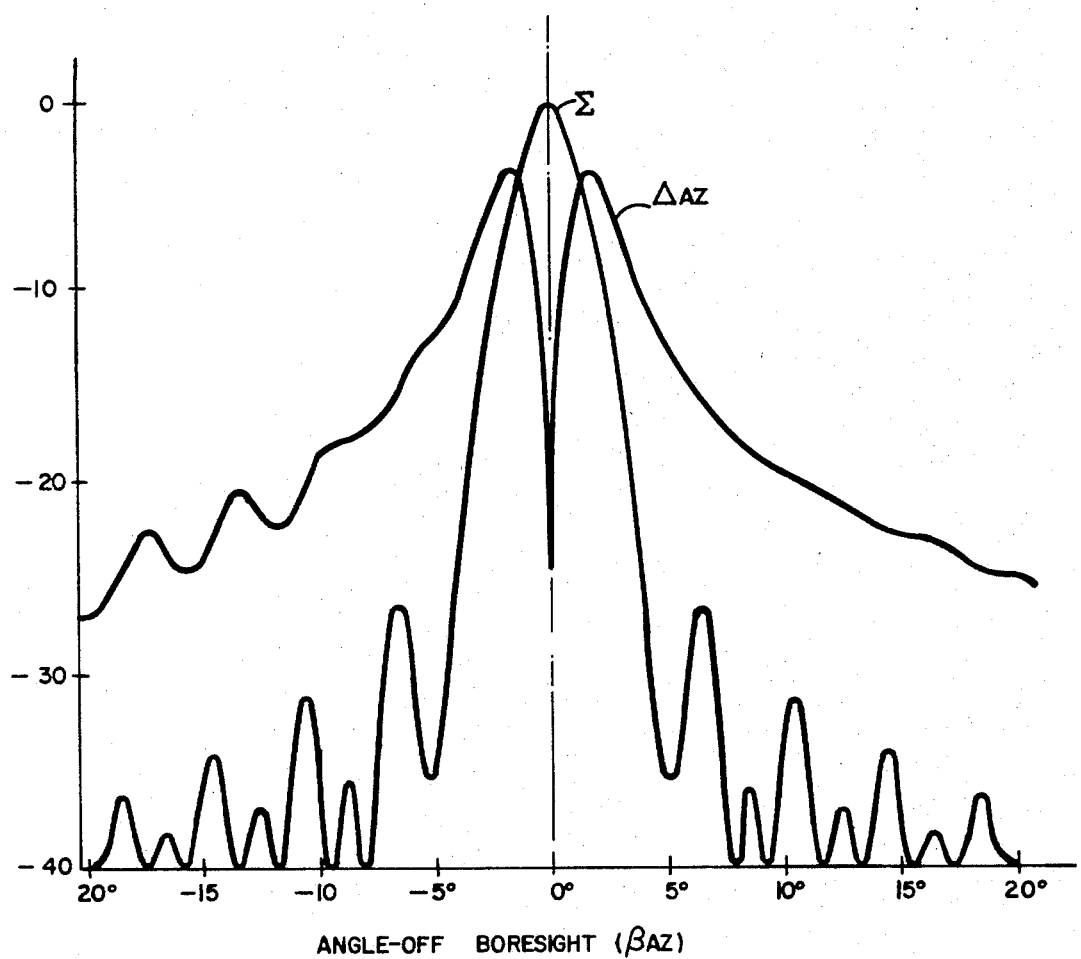

Representative monopulse sum and difference patterns for such arrays in elevation and azimuth are shown, respectively, in FIGS. 7 and 8, and illustrate the low level side lobe response of the sum ($\Sigma$) pattern relative to the difference ($\Delta$) pattern whereby monopulse beta-anomalies are avoided and monopulse resolution improvement (beta-gating) techniques may be successfully employed. The wider sum beam pattern in elevation (in FIG. 7) relative to that for the azimuth pattern (FIG. 8) is due, of course to the relatively small aperture presented in elevation by the representative array of FIGS. 4 and 5.

Although the corporate feeds, utilized in the practice of the invention, have been illustrated as extending rearwardly of the backside of the assembly, it is clear that such feed structure may be folded at right angle to run generally parallel to the array, and also folded back upon itself, in order to reduce the moment of inertia of the antenna assembly.

Where electronic beam-scanning may be desired, either to supplement or to supplant a mechanical scanning mode for the frequency-insensitive array assembly of the invention, then voltage-controlled phase-shifters 17 may be incorporated in the feeds of FIGS. 4, 5, 6, 9 and 10 to effect a phased-array. The concept of such phase arrays is well understood in the art, being explained for example in Section 7.7 of "Introduction to Radar Systems" by Skolnik, published by McGraw-Hill (1962). Selective control of such phase-arrays may also be employed to rapidly switch from one form of beam pattern to another, in conjunction with the employment of a multimode radar system in a selected one of a number of alternative modes.

Accordingly, a broadband, symmetrical array adapted for multi-mode systems, including monopulse applications, has been described.

Although the invention has been described and illustrated in detail, it is to be clearly understood that the same is by way of illustration and example only and is not to be taken by way of limitation, the spirit and scope of this invention being limited only by the terms of the appended claims.

I claim:
1. A symmetrical antenna assembly comprising a plurality of mutually parallel center-fed slotted travelling wave line sources and having a plane of symmetry parallel to said line sources, those centerfed line sources on a respective one of two sides of said plane being coupled by a corporate feed to a respective one of opposite input ports of a microwave hybrid junction.

2. The device of claim 1 in which said centerfed line sources each comprise a first and second mutually angled half, said angled line sources defining two mutually-angled arrays.

3. The device of claim 2 in which those centerfed line sources on a respective one of said two sides of said plane of symmetry define respective mutually-angled arrays, whereby said antenna assembly comprises four-mutually-angled planar arrays.

4. The device of claim 2 in which a broadside direction of each of said arrays of said symmetrical assembly differs from a broadside direction of said assembly by an angle corresponding to a direction frequency within the midband of the operating frequency bandwidth of said assembly.

5. The device of claim 2 in which the broadside direction of each array differs from the broadside direction of said assembly by a minimum amount corresponding to the direction difference between the broadside direction frequency of a highest VSWR condition and a direction frequency at the bandwidth limit associated with a preselected maximum VSWR condition.

6. The device of claim 2 in which the squint angle of each array corresponds to the angular difference between that propagation direction associated with the frequency producing a maximum VSWR and that direction associated with a direction frequency in the midband of the operational frequency bandwidth of said assembly.

7. A plurality of mutually parallel end-fed slotted travelling wave line sources arranged as a symmetrical centerfed antenna assembly comprising four arrays, those arrays on opposite sides of a plane of symmetry perpendicular to said line sources being mutually angled.

8. The device of claim 7 in which there is further provided a parallel corporate feed structure in cooperation with said centerfed symmetrical assembly and comprising four corporate feeds lines, each coupled to the end-fed line sources of a mutually exclusive one of said four arrays.

9. The device of claim 8 in which there is further provided a dual plane monopulse corporate feed structure in cooperation with said centerfed symmetrical assembly and comprising:
a microwave hybrid bridge having at least four input ports; and
four parallel corporate feeds, each intercoupling mutually exclusive one of said arrays to a mutually exclusive one of said ports of said hybrid bridge.

10. The device of claim 9 in which there is further included phase-shift means in cooperation with said corporate feed of said end fed line sources for providing a phased array.

11. The device of claim 7 in which there is further provided a series corporate feed structure in cooperation with said symmetrical assembly and comprising four series corporate feed lines, each coupled to the end-fed line sources of a mutually exclusive one of said four arrays, those arrays on opposite sides of a plane of symmetry parallel to said line sources being mutually angled.

12. A broadband antenna comprising a symmetrical centerfed travelling wave assembly of at least two mutually angularly squinted arrays of slotted travelling wave line sources oppositely disposed about a first plane of symmetry, those centerfed slotted travelling wave line sources on opposite sides of a second plane of symmetry perpendicular to said first plane being coupled by a corporate fed to opposite input ports of a microwave hybrid junction, line sources on a like side of said plane being connected to a like one of said input ports.

13. A broadband antenna comprising a symmetrical centerfed travelling wave assembly of at least two mutually angularly squinted arrays of slotted travelling wave line sources oppositely disposed about a first plane of symmetry, those centerfed slotted travelling wave line sources of a respective one of two sides of a second plane of symmetry perpendicular to said first plane being coupled by a corporate feed to a respective one of opposite input ports of a microwave hybrid junction.

References Cited
UNITED STATES PATENTS

| | | | |
|---|---|---|---|
| 2,405,242 | 8/1946 | Southworth | 343—771 |
| 2,807,800 | 9/1957 | Broussaud | 343—771 |
| 2,981,948 | 4/1961 | Kurtz | 343—771 |
| 3,136,993 | 6/1964 | Goldbohm | 343—771 X |
| 3,286,260 | 11/1966 | Howard | 343—771 X |

RICHARD A. FARLEY, *Primary Examiner.*

R. E. BERGER, *Assistant Examiner.*

U.S. Cl. X.R.

343—853